(12) United States Patent
Tokusaki et al.

(10) Patent No.: US 10,848,072 B2
(45) Date of Patent: Nov. 24, 2020

(54) POWER SUPPLY CONTROL DEVICE, POWER CONVERSION SYSTEM, AND POWER SUPPLY CONTROL METHOD

(71) Applicants: OMRON Corporation, Kyoto (JP); NATIONAL UNIVERSITY CORPORATION HOKKAIDO UNIVERSITY, Sapporo (JP)

(72) Inventors: Hiroyuki Tokusaki, Nara (JP); Takashi Hyodo, Kusatsu (JP); Satoshi Ogasawara, Sapporo (JP); Wataru Kodaka, Sapporo (JP)

(73) Assignees: OMRON Corporation, Kyoto (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 0 days.

(21) Appl. No.: 16/489,703

(22) PCT Filed: Nov. 21, 2017

(86) PCT No.: PCT/JP2017/041753
§ 371 (c)(1),
(2) Date: Aug. 29, 2019

(87) PCT Pub. No.: WO2018/159027
PCT Pub. Date: Sep. 7, 2018

(65) Prior Publication Data
US 2020/0235674 A1 Jul. 23, 2020

(30) Foreign Application Priority Data
Mar. 2, 2017 (JP) .................................. 2017-039783

(51) Int. Cl.
*H02M 5/00* (2006.01)
*H02M 5/293* (2006.01)
*H02M 5/297* (2006.01)

(52) U.S. Cl.
CPC ........... *H02M 5/293* (2013.01); *H02M 5/297* (2013.01)

(58) Field of Classification Search
CPC ...... H02M 5/293; H02M 5/297; H02M 1/425; H02M 1/34; H02M 2001/0058; H02M 2001/348
See application file for complete search history.

(56) References Cited

U.S. PATENT DOCUMENTS 5,483,435 A * 1/1996 Uchino .................... H02P 9/48
363/127
10,263,539 B2 * 4/2019 Yuasa ..................... F25B 31/02
(Continued)

FOREIGN PATENT DOCUMENTS

EP 2963792 A1 1/2016
EP 3104510 A1 12/2016
(Continued)

OTHER PUBLICATIONS

The extended European search report dated Jun. 17, 2020 in a related European patent application.
(Continued)

*Primary Examiner* — Adolf D Berhane
*Assistant Examiner* — Afework S Demisse
(74) *Attorney, Agent, or Firm* — Metrolex IP Law Group, PLLC

(57) ABSTRACT

A power supply control device according to one or more embodiments may be provided, in which a power conversion device has a configuration in which a resonant circuit is provided on an output side of a matrix converter using
(Continued)

switching circuits including snubber elements so as to perform AC-AC conversion of output from a multi-phase AC power supply. The power conversion device is controlled to make an amplitude of an output current, a phase of the output current and an instantaneous reactive power as close to a control target as possible. The amplitude and the phase of the output current and the instantaneous reactive power are derived based on: an input voltage and a phase of a multi-phase current input to the power conversion device; and characteristics of the resonant circuit.

20 Claims, 9 Drawing Sheets

(56) References Cited

U.S. PATENT DOCUMENTS

2015/0256095 A1* 9/2015 Ohta .................. H02P 21/05
363/37

| 2016/0006345 A1 | 1/2016 | Yoshinaga et al. |
| 2016/0352238 A1 | 12/2016 | Ogasawara et al. |

FOREIGN PATENT DOCUMENTS

| JP | 2010-263702 A | 11/2010 |
| JP | 2014-045566 A | 3/2014 |
| JP | 2015-149857 A | 8/2015 |
| WO | 2014/020898 A1 | 2/2014 |

OTHER PUBLICATIONS

An English translation of the International Search Report("ISR") of PCT/JP2017/041753 dated Jan. 23, 2018.
An English translation of the Written Opinion("WO") of PCT/JP2017/041753 dated Jan. 23, 2018.
The extended European search report dated Jun. 9, 2020 in a counterpart European patent application.

* cited by examiner (a)

(b)

(c)

(a)

(b)

(a)

(b)

POWER SUPPLY CONTROL DEVICE, POWER CONVERSION SYSTEM, AND POWER SUPPLY CONTROL METHOD

TECHNICAL FIELD

The present invention relates to a power supply control device to control a power conversion device that is connected to a multi-phase AC power supply for every phase and that performs AC-AC conversion by a plurality of switching circuits so as to output the converted power via a resonant circuit. The present invention also relates to a power conversion system including the power supply control device, and to a power supply control method executed by the power conversion system.

BACKGROUND ART

A power conversion device draws the attention, in which power is input from a multi-phase AC power supply and is output to a load side after being subjected to AC-AC conversion by a matrix converter. The matrix converter turns on/off respective switching circuits each connected to a corresponding phase of the multi-phase AC power supply as an input so as to perform AC-AC conversion without conversing the power into a direct current, and outputs the alternating current power to the load side. The matrix converter controls switching of a bidirectional switch according to the voltage, frequency and the like of the alternating current power to be output to the load side. The matrix converter that converts an alternating current power into an alternating current power can reduce conversion loss and furthermore can easily realize the size reduction because no inverter is needed, compared to the power conversion with an inverter in which power is converted from an alternating current power into a direct current power, and after that once again is converted into an alternating current power.

The applicants of the present invention have already disclosed a soft switching technique in the matrix converter (see Patent Document 1). In this technique, the switching is performed in the state in which the voltage or the current is zero as a result of a phase difference between the voltage and the current generated by a resonant circuit provided on the output side.

With the soft switching, it is possible to obtain various effects such as: reduction of switching loss; prevention of degradation of conversion efficiency; and reduction of stress applied to a semiconductor device, compared to hard switching that performs conversion by forcibly switching on/off the circuits in the state in which the voltage is applied and the current flows.

PRIOR ART DOCUMENT

Patent Document

[Patent Document 1] JP 2015-149857 A

SUMMARY OF THE INVENTION

Problem to Be Solved by the Invention

The applicants of the present invention have further developed the technique disclosed in Patent Document 1 above so as to realize control to stabilize the output, i.e. reduction of distortion of the input current that is input to the power conversion device, and reduction of pulsation of the output current that is output from the power conversion device.

The present invention was made in consideration of the above circumstances, and the calculations for switching control were revised. A principal object of the present invention is to provide a power supply control device capable of stabilizing the output from the power conversion device.

Also, another object of the present invention is to provide a power conversion system using the power supply control device according to the present invention.

Furthermore, another object of the present invention is to provide a power supply control method that can be executed in the power conversion system according to the present invention.

Means for Solving the Problem

In order to solve the above problem, a power supply control device of the present invention is configured to control a power conversion device including a plurality of switching circuits that is connected to a multi-phase AC power supply for every phase and that each has a snubber element capable of being charged and discharged. The power conversion device is configured to: perform AC-AC conversion of input from the multi-phase AC power supply by the plurality of switching circuits; and output the converted AC power via a resonant circuit. The power supply control device includes: controlling means for performing control of the power conversion device to make an amplitude of an output current, a phase of the output current and an instantaneous reactive power as close to a control target as possible. The amplitude of the output current, the phase of the output current and the instantaneous reactive power are derived based on: an input voltage and a phase of a multi-phase current that is input to the power conversion device; and characteristics of the resonant circuit. The amplitude of the output current of the power conversion device is derived from a target output voltage waveform that is obtained by removing a higher order component from a staircase waveform derived based on the input voltage and the phase.

Furthermore, the power supply control device of the present invention is configured to control a power conversion device including a plurality of switching circuits that is connected to a multi-phase AC power supply for every phase and that each has a snubber element capable of being charged and discharged. The power conversion device is configured to: perform AC-AC conversion of input from the multi-phase AC power supply by the plurality of switching circuits; and output the converted AC power via a resonant circuit. The power supply control device includes: controlling means for performing control of the power conversion device to make an amplitude of an output current, a phase of the output current and an instantaneous reactive power as close to a control target as possible. The amplitude of the output current, the phase of the output current and the instantaneous reactive power are derived based on: an input voltage and a phase of a multi-phase current that is input to the power conversion device; and characteristics of the resonant circuit. The instantaneous reactive power is derived from: a target output voltage waveform derived from the input voltage and the phase; and a target output current waveform that periodically changes.

Also, in the above-described power supply control device, the amplitude of the output current of the power conversion device is derived based on: an amplitude and a phase of the target output voltage waveform; the characteristics of the resonant circuit; and an output frequency recursively obtained. The amplitude and the phase of the target output voltage waveform are derived by: deriving a staircase waveform based on the input voltage and the phase, and a switching time ratio of the switching circuits; and furthermore removing a higher order component from the derived staircase waveform.

Also, in the above-described power supply control device, the phase of the output current of the power conversion device is derived based on: a derived staircase waveform; an output frequency recursively obtained; a charge/discharge condition of the snubber element; the amplitude of the output current; a phase of the target output voltage waveform; and the phase of the output current. The amplitude and the phase of the output current are derived based on: an amplitude and the phase of the target output voltage waveform; the characteristics of the resonant circuit; and the output frequency recursively obtained. The amplitude and the phase of the target output voltage waveform are derived by: deriving the staircase waveform based on the input voltage and the phase, and a switching time ratio of the switching circuits; and removing a higher order component from the derived staircase waveform.

Also, in the above-described power supply control device, the phase of the output current of the power conversion device is derived from a phase difference between: a first phase derived based on the staircase waveform, the output frequency recursively obtained, and a capacitance that serves as the charge/discharge condition of the snubber element; and a second phase derived based on the phase of the target output voltage waveform and the phase of the output current. The controlling means makes the phase difference zero as the control target.

Also, in the above-described power supply control device, the instantaneous reactive power is derived from an input current, the input voltage and the phase. The input current that is input to the power conversion device is derived based on: a phase of the target output voltage waveform and the phase of the output current; the amplitude of the output current; a switching time ratio of the switching circuits; and a target output current waveform that periodically changes. The amplitude and the phase of the output current are derived based on: an amplitude and the phase of the target output voltage waveform; the characteristics of the resonant circuit; and an output frequency recursively obtained. The amplitude and the phase of the target output voltage waveform are derived by: deriving a staircase waveform based on the input voltage and the phase, and a switching time ratio of the switching circuits; and removing a higher order component from the derived staircase waveform.

Also, in the above-described power supply control device, the target output current waveform that periodically changes is a sine wave.

Also, in the above-described power supply control device, the switching time ratio of the switching circuits is obtained by recursive calculation or by reading a predetermined value set in advance.

Also, in the above-described power supply control device, the controlling means makes the instantaneous reactive power zero as the control target.

Also, a power conversion system of the present invention includes: a power conversion device including a plurality of switching circuits that is connected to a multi-phase AC power supply for every phase and that each has a snubber element capable of being charged and discharged; and the above-described power supply control device. The power conversion device is configured to: perform AC-AC conversion of input from the multi-phase AC power supply by the plurality of switching circuits; and output the converted AC power via a resonant circuit.

Furthermore, a power supply control method of the present invention is to control a power conversion device including a plurality of switching circuits that is connected to a multi-phase AC power supply for every phase. The power conversion device is configured to: perform AC-AC conversion of input from the multi-phase AC power supply by the plurality of switching circuits; and output the converted AC power via a resonant circuit. The power supply control method includes the step of performing control of the power conversion device to make an amplitude of an output current, a phase of the output current and an instantaneous reactive power as close to a control target as possible. The amplitude of the output current, the phase of the output current and the instantaneous reactive power are derived based on: an input voltage and a phase of a multi-phase current that is input to the power conversion device; and characteristics of the resonant circuit. The amplitude of the output current of the power conversion device is derived from a target output voltage waveform that is obtained by removing a higher order component from a staircase waveform derived based on the input voltage and the phase.

Furthermore, a power supply control method of the present invention is to control a power conversion device including a plurality of switching circuits that is connected to a multi-phase AC power supply for every phase. The power conversion device is configured to: perform AC-AC conversion of input from the multi-phase AC power supply by the plurality of switching circuits; and output the converted AC power via a resonant circuit. The power supply control method includes the step of performing control of the power conversion device to make an amplitude of an output current, a phase of the output current and an instantaneous reactive power as close to a control target as possible. The amplitude of the output current, the phase of the output current and the instantaneous reactive power are derived based on: an input voltage and a phase of a multi-phase current that is input to the power conversion device; and characteristics of the resonant circuit. The instantaneous reactive power is derived from: a target output voltage waveform derived from the input voltage and the phase; and a target output current waveform that periodically changes.

With the power supply control device, the power conversion system and the power supply control method of the present invention, it is possible to stabilize the output from the power conversion device.

Effect of the Invention

In the present invention, the preferable amplitude of the output current, the preferable phase of the output current and the preferable instantaneous reactive power of the power conversion device are derived based on: the input voltage and the phase of a multi-phase current that is input to the power conversion device; and characteristics of the resonant circuit. The power conversion device is controlled to make the derived results as close to a control target as possible. In this way, the present invention provides an advantageous effect of stabilizing the power conversion device such as reduction of distortion of the input current that is input to the power conversion device, and reduction of pulsation of the output current that is output from the power conversion device.

MEANS FOR CARRYING OUT THE INVENTION

Hereinafter, an embodiment of the present invention will be described with reference to the drawings. The embodiment described below is an embodied example of the present invention, which does not limit the technical scope of the present invention.
<Power Conversion System>

Figure 1:
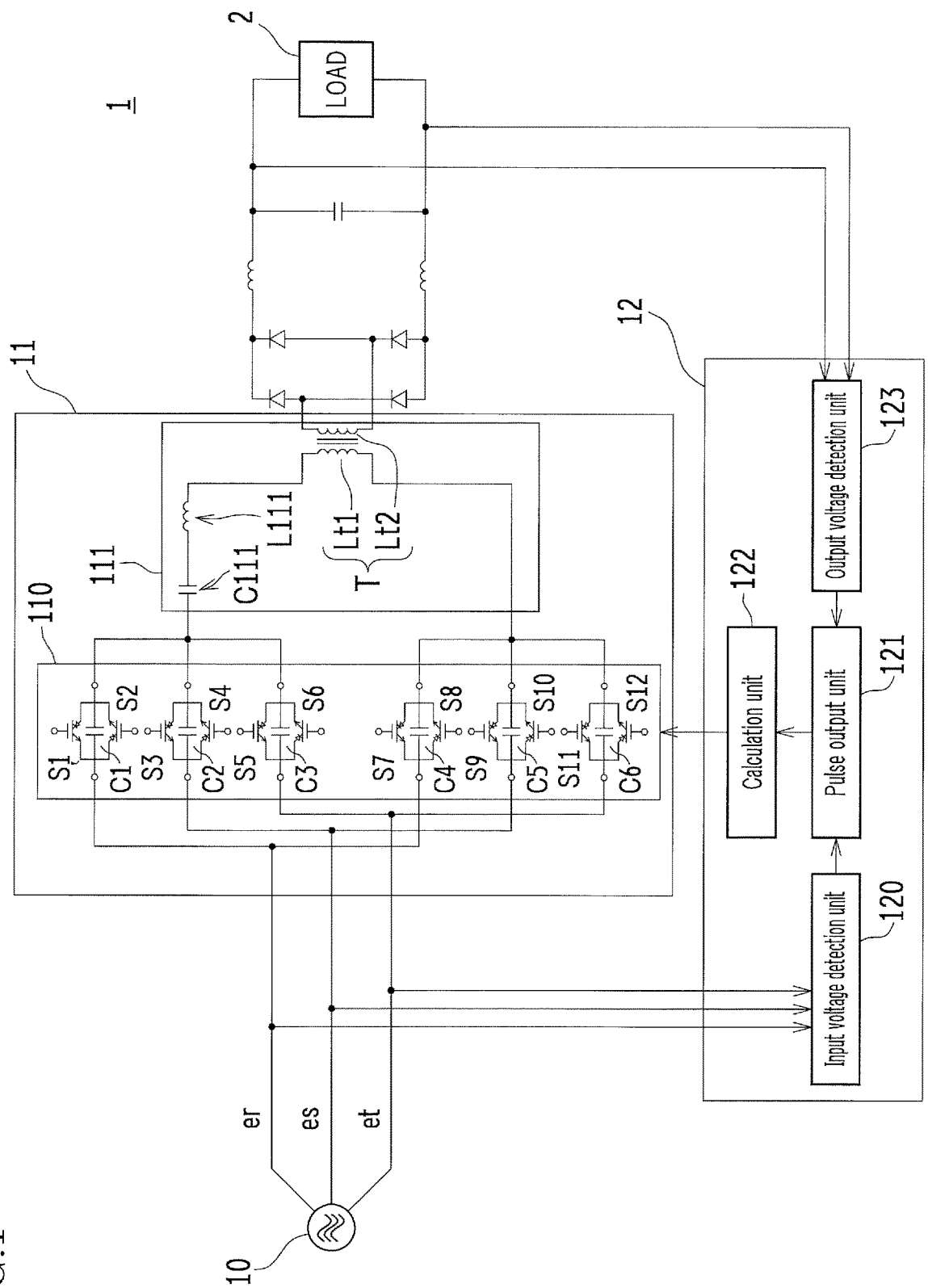
FIG. 1 is a schematic configuration diagram illustrating an example of a circuit configuration of a power conversion system of the present invention.

FIG. 1 is a schematic configuration diagram illustrating an example of a circuit configuration of a power conversion system of the present invention. A power conversion system 1 exemplarily illustrated in FIG. 1 performs AC-AC conversion of alternating current power that is input from a multi-phase AC power supply 10 such as a three-phase AC power supply. In the example shown in FIG. 1, the power conversion system 1 outputs the converted alternating current power to charge a power load 2 such as a rechargeable battery mounted in a vehicle. The alternating current power, which is output from the power conversion system 1, is input to the vehicle side in a non-contact state via a transformer T and is converted into direct current power by an AC-DC conversion device on the vehicle side so as to be supplied to the power load 2. The AC-DC conversion device may be mounted in the vehicle or disposed outside the vehicle.

The power conversion system 1 includes a power conversion device 11 and a power supply control device 12. The power conversion device 11 is provided with a matrix converter 110 having a plurality of switching circuits and a resonant circuit 111 such as an LLC circuit or the like. The power supply control device 12 controls the power conversion device 11.

The matrix converter 110 exemplarily shown in FIG. 1 has six pairs of switching circuits. Each pair of switching circuits serves as a bidirectional switch. To each phase (i.e. R-phase, S-phase and T-phase) that is input from the three-phase AC power supply 10, two corresponding bidirectional switches as switching circuits are connected in parallel. Each bidirectional switch is constituted of: two switching elements; two diodes; and one capacitor (snubber capacitor) serving as a snubber element. Hereinafter, a switching circuit having switching elements S1 and S2 is described as an example. However, the other switching circuits having switching elements S3-S12 also have the same configuration.

The switching elements S1 and S2 are semiconductor switches not having reverse-conducting function. For the switching elements S1 and S2, elements such as an insulated gate bipolar transistor (IGBT) and a metal oxide semiconductor field effect transistor (MOSFET) are used. Since the two switching elements S1 and S2 are connected in anti-parallel to each other to form the switching circuit, the switching circuit serves as a bidirectional switch.

A capacitor C1 that serves as a snubber element is connected between collectors and emitters of the respective switching elements S1 and S2 connected in anti-parallel to each other.

Figure 4A:
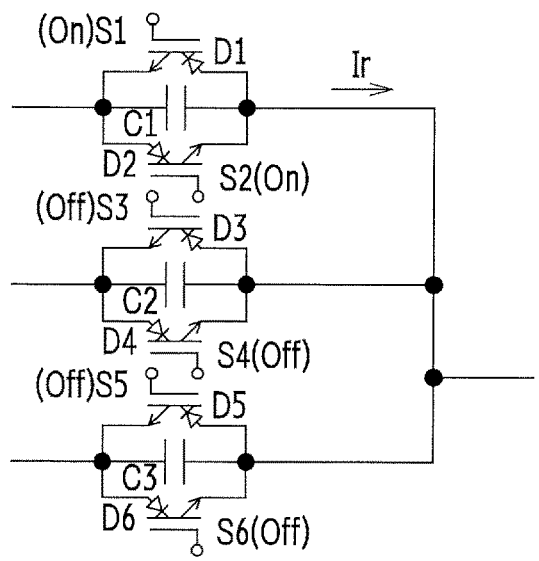
FIGS. 4A(a) to 4A(c) are time charts chronologically indicating operation states of the switching elements provided in the power conversion device in the power conversion system of the present invention.
Figure 4A:
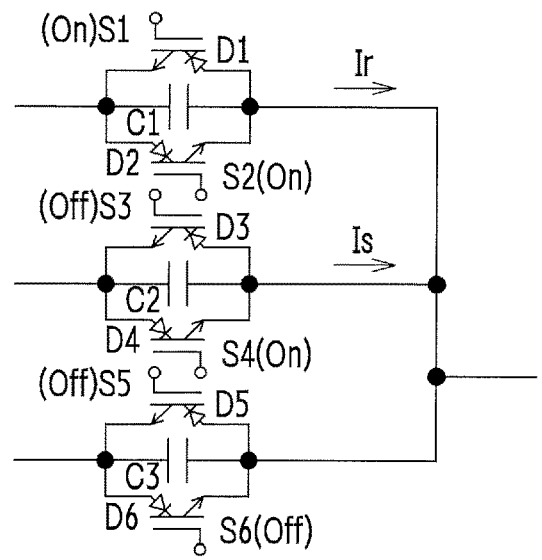
Figure 4A:
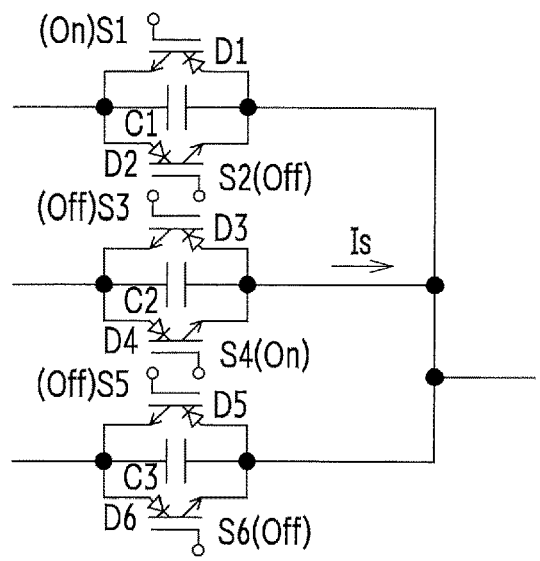

Also, between respective collectors and bases of the switching elements S1 and S2, diodes D1 and D2 (see, for example, FIGS. 4A(a) to 4A(c) and 4B(a) and 4B(b)) are connected.

Similarly to the above, each of the other switching circuits having the corresponding switching elements S3-S12 is also provided with a corresponding one of capacitors C2-C6 and diodes (see, for example, D3 to D6 illustrated in FIGS. 4A(a) to 4A(c) and 4B(a) and 4B(b)).

The matrix converter 110 having the above six pairs of switching circuits is connected for every phase to the three-phase AC power supply 10 such that an interphase voltage between any two phases of the three-phase AC power supply 10 is output by switching on and off the respective switching elements S1 to S12. Also, the output from the three-phase AC power supply 10, which is constituted of the R-phase, the S-phase and the T-phase, is branched to either of a U-phase formed using the switching elements S1 to S6 and a V-phase formed using the switching elements S7 to S12 according to the direction of the current flow. The switching on/off of each of the respective switching elements S1 to 512 is controlled by the power supply control device 12.

The resonant circuit 111 is an LLC circuit formed by a capacitor C111 and a coil L111 connected in series, and a primary coil Lt1 of the transformer T that is connected to the power load 2 in a non-contact state. The resonant frequency of the resonant circuit 111 is determined according to the frequency of the alternating current voltage that is output from the power conversion device 11. To a secondary coil Lt2 constituting the transformer T together with the primary coil Lt1, the power load 2 is connected via an AC-DC conversion device.

The power supply control device 12 includes various elements such as: an input voltage detection unit 120; a calculation unit 121; a pulse output unit 122; and an output voltage detection unit 123.

The input voltage detection unit 120 is a circuit that detects respective voltages of the phases input from the three-phase AC power supply 10. In the example shown in FIG. 1, the power conversion system 1 detects respective voltages er, es and et of the R-phase, the S-phase and the T-phase, and outputs the input voltage E and the phases θr, θs and θt to the calculation unit 121.

The calculation unit 121 derives, based on the input voltage detected by the input voltage detection unit 120 and an input default value of the input voltage phase, phase differences between the respective phases and frequencies based on the phase differences as target values for the power conversion device 11 to perform the conversion. Then, the calculation unit 121 outputs output values according to the phase differences and the frequencies to the pulse output unit 122 so as to control the matrix converter 110 to realize the derived phase differences and frequencies.

The pulse output unit 122 generates pulse wise modulation (PWM) signals based on the output values from the calculation unit 121 and outputs the generated PWM signals to the matrix converter 110 so as to control the respective switching elements S1 to S12 of the matrix converter 110.

The details of the calculation by the calculation unit 121 and the control of the switching elements S1 to S12 based on the calculation results will be described later.

The calculation unit 121 controls the entire power supply control device 12 so that the power supply control device 12 operates. The calculation unit 121 may be realized as hardware using a logic circuit such as VLSI and LSI, or may also be realized as a recording circuit such as a flash memory or a control circuit such as a CPU that executes a computer program recorded in the recording circuit. Furthermore, the above components may be combined as necessary. That is, the power supply control device 12 is configured, for example, as a control board on which a logic circuit is mounted, and as a computer that stores and executes a power control program for realizing the power supply control method of the present invention.

<Control Method>

Figure 2:
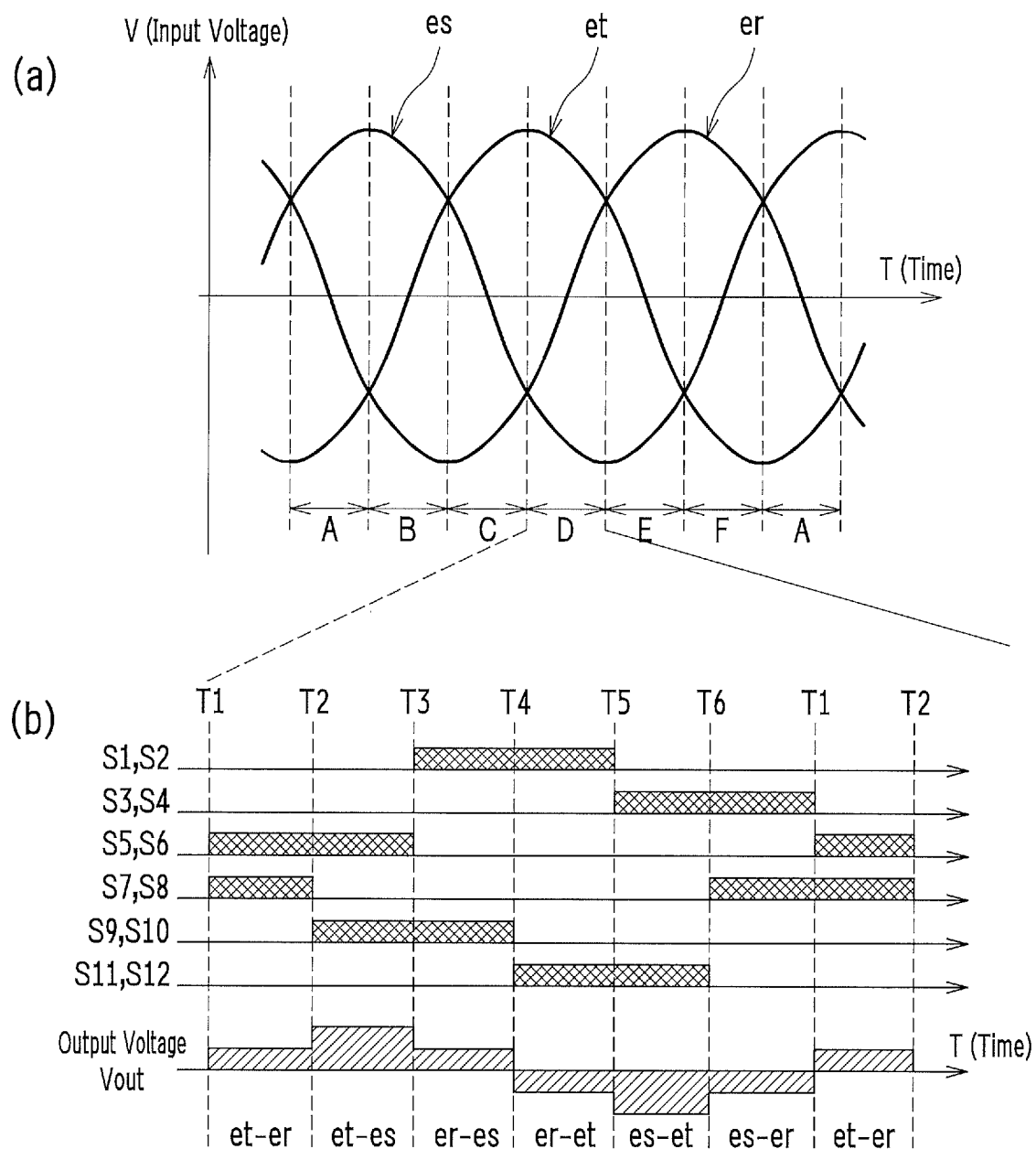
FIGS. 2(a) and 2(b) are explanation diagrams indicating voltage waveforms of a three-phase AC power supply and control patterns of switching elements in the power conversion system of the present invention.

FIGS. 2(a) and 2(b) are explanation diagrams indicating voltage waveforms of the three-phase AC power supply 10 and control patterns of the switching elements in the power conversion system 1 of the present invention. FIG. 2(a) indicates changes in the respective phase voltages over time. The phase voltages are output from three-phase AC power supply 10, and the graph is plotted with time as the horizontal axis and voltage value of the input voltage Vin as the vertical axis. Each phase of the voltage waveforms er, es and et is shifted from each other by ⅔π (120°). The power supply control device 12 controls the respective states of the six pairs of switching circuits (i.e. on/off state of the switching elements S1 to S12) of the power conversion circuit using each control pattern corresponding to 6 sections classified by the magnitude relationship of the respective phase voltages (i.e. sections A to F in FIGS. 2(a) and 2(b)).

FIG. 2(b) indicates changes in the respective control patterns of the switching elements S1 to S12 and in the voltage value of the output voltage Vout over time. In the graph, the horizontal axis corresponds to conceptual time. Note that the time period from the time point T1 to the time point T6 as well as the next time period in the horizontal axis are equally divided, as conceptual time, into the respective intervals for the sake of explanation. However, the time intervals between the respective time points are not necessarily the same. The control patterns in FIG. 2(b) are the control patterns of the switching elements S1 to S12 at the interval D shown in FIG. 2(a). In the changes over time in the switching elements S1 to S12 shown in FIGS. 2(a) and 2(b), the intervals at which the switching elements is switched on are indicated with hatched lines.

The power supply control device 12 repeatedly performs switching on/off the switching elements S1 to S12. Thus, the interphase voltage that is output from the power conversion device 11 periodically changes as shown in FIGS. 2(a) and 2(b).

Figure 3:
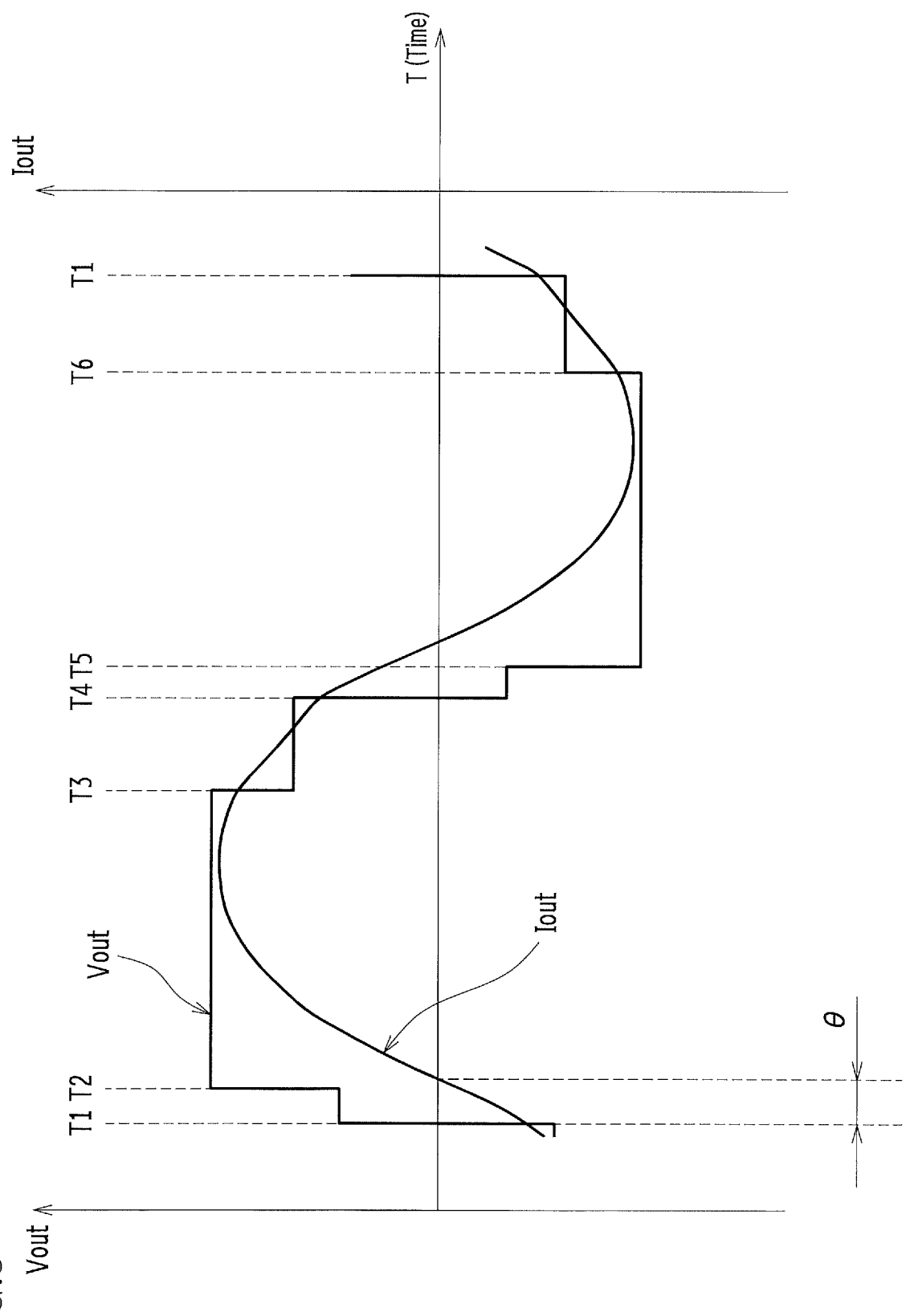
FIG. 3 is a graph chronologically indicating a relationship between an output voltage and an output current of a power conversion device in the power conversion system of the present invention.

FIG. 3 is a graph chronologically indicating a relationship between the output voltage and the output current of the power conversion device 11 in the power conversion system 1 of the present invention. FIG. 3 indicates changes in the output voltage Vout and in the output current Iout over time, with time as the horizontal axis, the output voltage Vout as the vertical axis on the left side and the output current Iout as the vertical axis on the right side. The output current Iout shows a U-phase current that is output from the switching circuits formed using the switching elements S1 to S6 in the power conversion device 11 to the power load 2, as exemplarily shown in FIG. 1. As shown in FIG. 3, the output voltage Vout is output as a staircase wave that shows a step-wise waveform. The output voltage Vout that is output as the staircase wave is inverted at the time point T1, and raised for the last time to reach the maximum value at the time point T2. Then, the output voltage Vout is dropped step by step from the time point T3 to the time point T5. The output voltage Vout is inverted at the time point T4 and reaches the minimum value at the time point T5 (i.e. falling for the last time). Since the power conversion device 11 includes the resonant circuit 111, the phase of the output current Iout is delayed by the time corresponding to the phase θ compared to the phase of the output voltage Vout. In the present invention, the time point T1 at which the voltage is inverted from negative to positive is used as a reference to define the phase.

FIGS. 4A(a) to 4A(c) and 4B(a) and 4B(b) are time charts chronologically indicating operation states of the switching elements S1 to S6 that are provided in the power conversion device 11 in the power conversion system 1 of the present invention. FIG. 5 is a graph chronologically indicating respective states of the switching elements S1 to S4 provided in the power conversion device 11, the output voltages and the output currents in the power conversion system 1 of the present invention. In FIGS. 4A(a) to 4A(c), 4B(a) and 4B(b) and 5, control states after the time point T5 at which the R-phase is switched to the S-phase as shown in FIGS. 2(a) and 2(b) and 3 are indicated, by further dividing the time period into intervals by time points t1 to t4. In FIGS. 4A(a) to 4A(c) and 4B(a) and 4B(b), the switching elements are switched in the order of FIG. 4A(a), FIG. 4A(b), FIG. 4A(c), FIG. 4B(a), and FIG. 4B(b). Vcr in FIG. 5 is a voltage between both ends of the capacitor C1 that is connected between the collectors and the emitters of the respective switching elements S1 and S2. Vcs is a voltage between both ends of the capacitor C2 that is connected between the collectors and the emitters of the respective switching elements S3 and S4. Ir is a current that flows through the R-phase while Is is a current that flows through the S-phase. Actually, the current that flows through the R-phase or the S-phase is not constant and fluctuates even when the state of the switching is not changed. However, for the sake of easy comprehension, the current is conceptually shown in FIG. 5, which is considered as constant when it flows and furthermore the switching is not changed.

First, at the time point t1 immediately after the time point T5 shown in FIGS. 2(a) and 2(b) and 3, the power supply control device 12 switches the switching element S4 from the off state to the on state (from FIG. 4A(a) to FIG. 4A(b)). At the time of switching the state of the switching element S4, the current does not flow through the S phase (i.e. Is=0). Thus, the state of the switching element S4 is switched at the time point t1 in zero current sequence (ZCS). Namely, the switching of the state of the switching element S4 at the time point t1 is soft switching.

Next, the power supply control device 12 switches the switching element S2 from the on state to the off state at the time point t2 (from FIG. 4A(b) to FIG. 4A(c)). At the time of switching the state of the switching element S2, the voltage between both ends of the capacitor C1 is 0V. Thus, the state of the switching element S2 is switched at the time point t2 in zero voltage sequence (ZVS). Namely, the switching of the state of the switching element S2 at the time point t2 is soft switching. Furthermore, since the switching element S2 is switched to the off state, charge of the capacitor C1 is started and the S-phase current Is is started to flow. Immediately after the time point t2 at which the switching element S2 is switched, the current flows temporarily through both phases due to connection of the capacitor C1 that is started to be charged. Therefore, as shown in FIG. 5, in the period immediately after the time point t2, the current is divided into the R-phase current Ir and the S-phase current Is until the charge of the capacitor C1 and the discharge of the capacitor C2 are terminated.

Figure 4B:
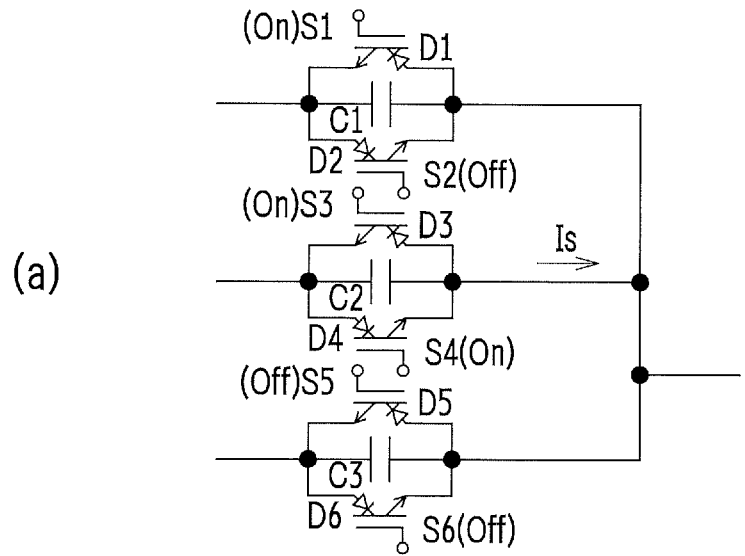
FIGS. 4B(a) and 4B(b) are time charts chronologically indicating operation states of the switching elements provided in the power conversion device in the power conversion system of the present invention.
Figure 4B:
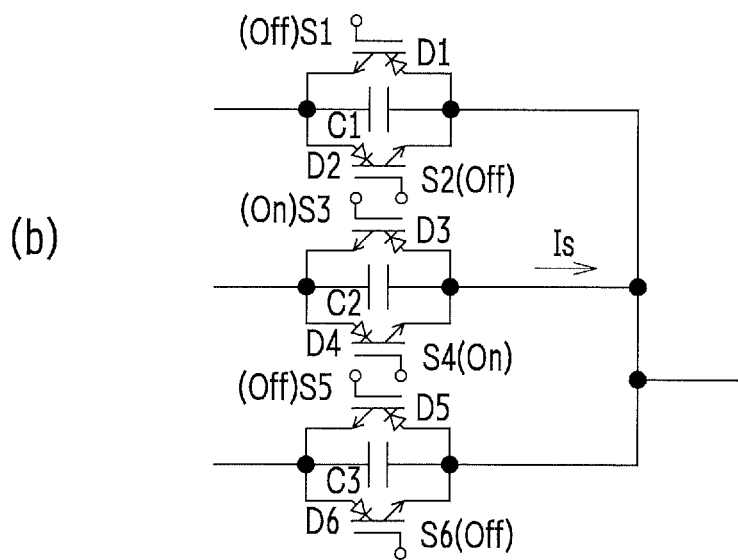
Figure 5:
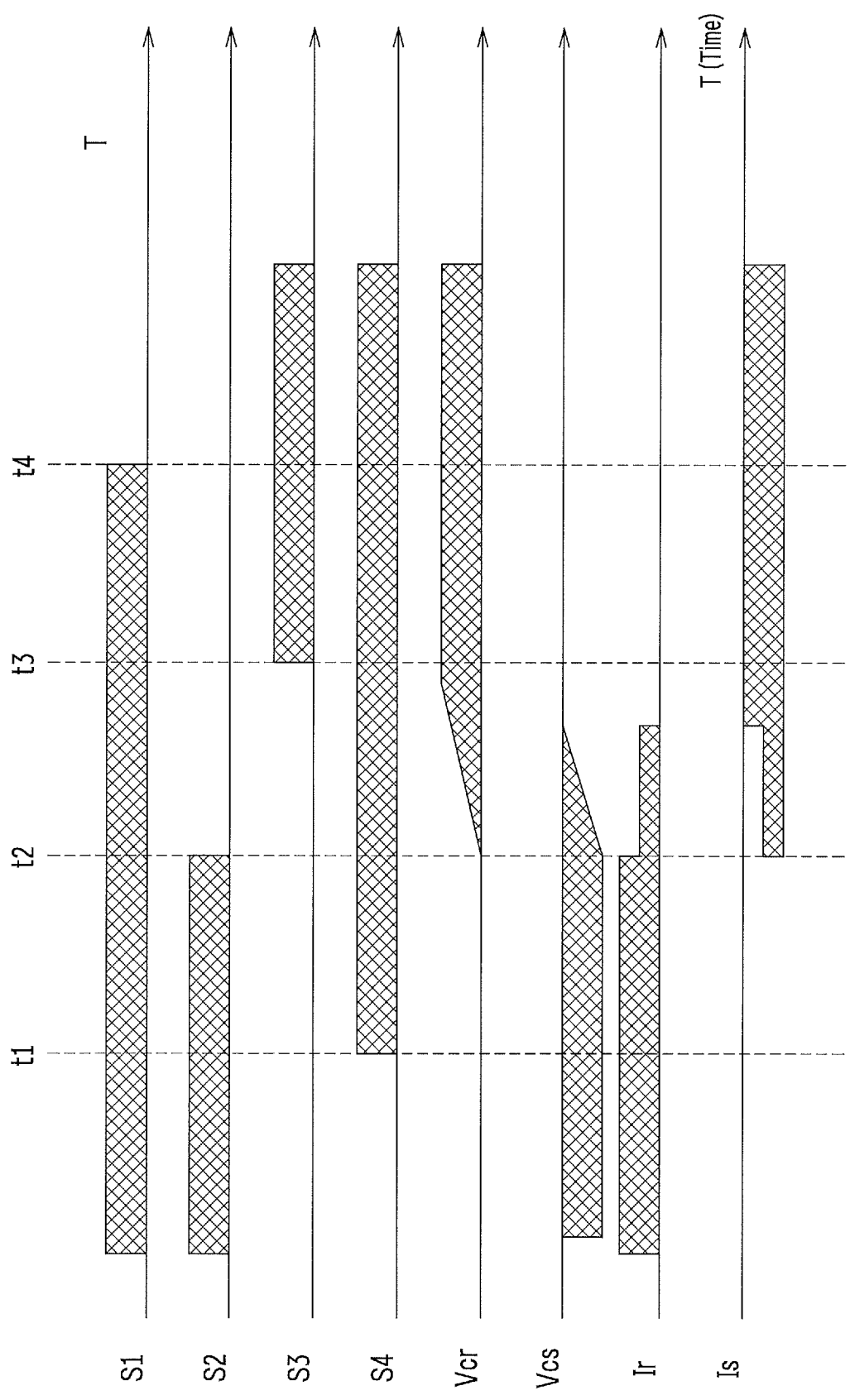
FIG. 5 is a graph chronologically indicating respective states of the switching elements provided in the power conversion device, the output voltages and the output currents in the power conversion system of the present invention.

The power supply control device 12 switches the switching element S3 from the off state to the on state at the time point t3 (from FIG. 4A(c) to FIG. 4B(a)). At the time of switching the state of the switching element S3, the voltage between both ends of the capacitor C2 is 0V. Thus, the state of the switching element S3 is switched at the time point t3 in zero voltage sequence (ZVS). Namely, the switching of the state of the switching element S3 at the time point t3 is soft switching.

Each capacitance of the capacitors C1 to C6 is set such that the discharge is terminated within the period from the time point t1 to the time point t3 and furthermore that the charge is terminated within the period from the time point t2 to the time point t3 based on the resonant frequency of the resonant circuit 111 and the size of the power load 2.

The power supply control device 12 switches the switching element S1 from the on state to the off state at the time point t4 (from FIG. 4B(a) to FIG. 4B(b)). At the time of switching the state of the switching element S1, the current does not flow through the R phase (i.e. Ir=0). Thus, the state of the switching element S4 is switched at the time point t4 in zero current sequence (ZCS). Namely, the switching of the state of the switching element S1 at the time point t4 is soft switching.

As described above, regarding commutation operations by the power conversion device 11, all the switching of the respective states of the switching elements S1 to S12 is soft switching, not hard switching. To such a power conversion device 11, for example, the technique described in detail in JP 2015-149857 A can be applied.

<Control and Various Calculations>

Here, description will be given on control and various calculations for the control in the power supply control system of the present invention in order to: perform soft switching; stabilize the system by reduction of distortion of the input current that is input to the power conversion device 11 and by reduction of pulsation of the output current that is output from the power conversion device 11; and improve the power factor of the input.

The reduction of distortion of the input current is realized by the control based on a target output current waveform that is obtained by supposing the output current that is output from the power conversion device 11 as a sine wave. Also, the reduction of pulsation of the output current is realized by the control to make the target value of the output voltage that is output from the power conversion device 11 as a waveform of a fundamental wave of the output voltage (i.e. target output voltage waveform) obtained by processing the output voltage waveform as a staircase waveform by Fourier series expansion, and by removing the higher order component.

Figure 6:
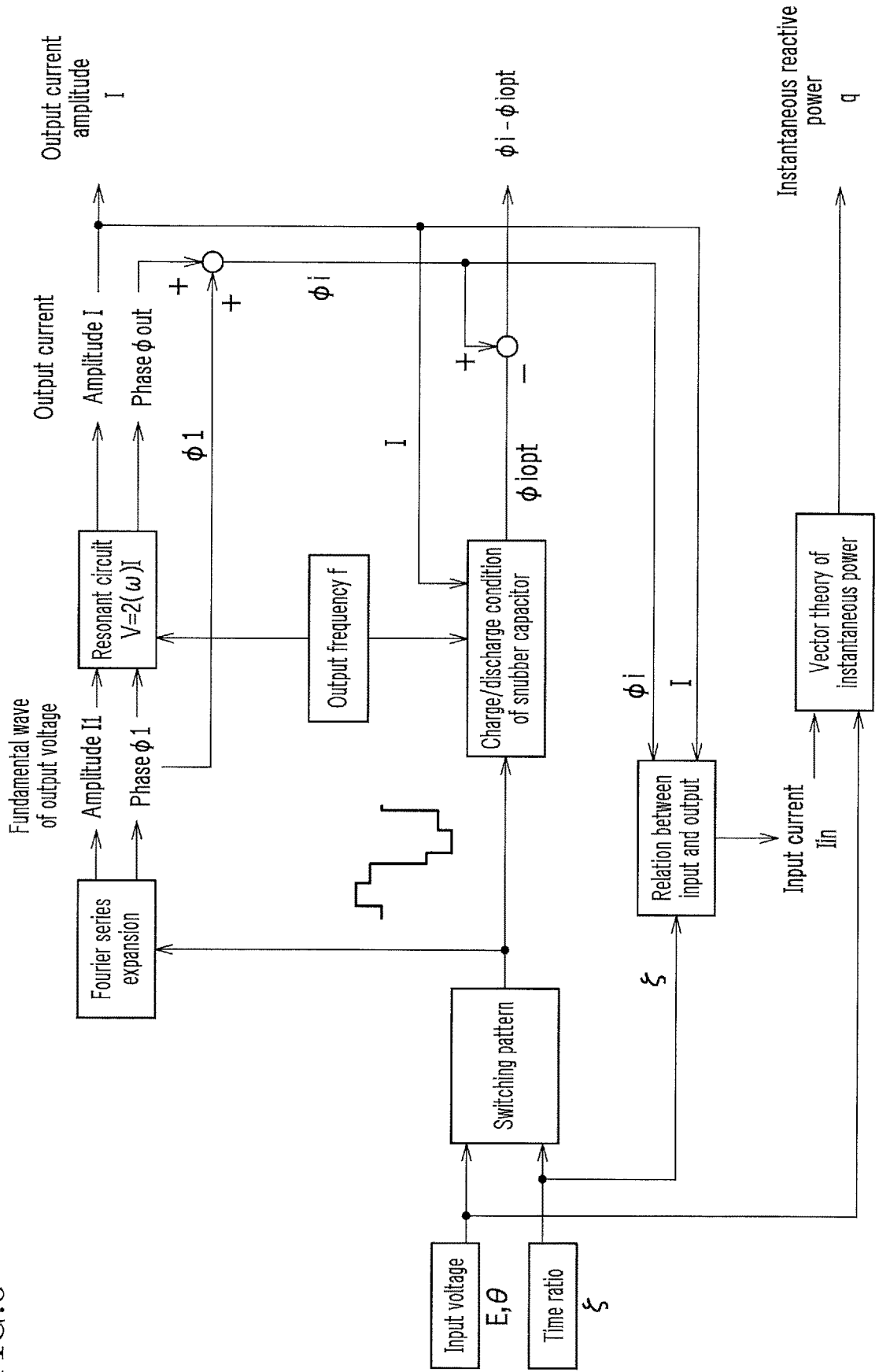
FIG. 6 is a block diagram conceptually indicating processing in a power supply control device of the present invention.

FIG. 6 is a block diagram conceptually indicating processing in the power supply control device 12 of the present invention. FIG. 6 shows calculations, as a block diagram, to control and obtain the target output current waveform and the target output voltage waveform as described above. The power supply control device 12 performs various calculations based on a time ratio $\zeta$ previously set or obtained by calculations, an input voltage E and a phase $\theta$ that are detected by the input voltage detection unit 120, and an output frequency f obtained by calculations. The time ratio $\zeta$ indicates a time ratio of on/off states of each of the switching elements (i.e. switching time ratio) provided in the matrix converter 110. More specifically, it indicates the ratio between the switching-on state and switching-off state of the switching elements and the periods to perform the switching. The time ratio $\zeta$ is derived as a solution that asymptotically converges by the calculation using the recursive algorithm. However, it is possible to use a default value that is previously set. The output frequency f is an output frequency from the power supply control device 12, and it can be derived as a solution that asymptotically converges by the calculation using the recursive algorithm.

The calculation unit 121 creates a waveform of the output voltage that is output as a step-wise wave from the power conversion device 11, i.e. an output voltage waveform based on: the input voltage E and the phase $\theta$ obtained by detection; the time ratio $\zeta$ obtained by recursive calculation or by reading the predetermined default value; and a switching pattern that is a control procedure for each switching element. The switching pattern may be set previously as a default value, or may also be a calculation result derived by calculations based on the default value and other conditions.

The calculation unit 121 processes the output voltage waveform created as the staircase waveform by the Fourier series expansion, and removes the higher order component so as to derive the waveform of the fundamental wave of the output voltage (i.e. target output voltage waveform). Furthermore, the calculation unit 121 derives an amplitude I of the output current based on: an amplitude I1 and a phase $\varphi 1$ of the fundamental wave according to the target output voltage waveform; characteristics of the resonant circuit 111 ($V=Z(\omega) \cdot I$); and the output frequency f recursively obtained.

Also, the calculation unit 121 derives an optimal current phase $\varphi iopt$ (first phase) based on: the output voltage waveform created as the staircase waveform; the amplitude I of the output current; the charge/discharge condition of the snubber element; and the output frequency f recursively obtained. The calculation unit 121 derives a phase $\varphi i$ (second phase) of the output voltage to the matrix converter 110, which is obtained by adding the phase $\varphi iout$ of the output current to the phase $\varphi 1$ of the target output voltage waveform derived as the fundamental wave of the output voltage.

Thus, the calculation unit 121 derives a phase difference (φi−φiopt) between the output current phase φi (second phase) and the optimal current phase φiout.

Figure 7:
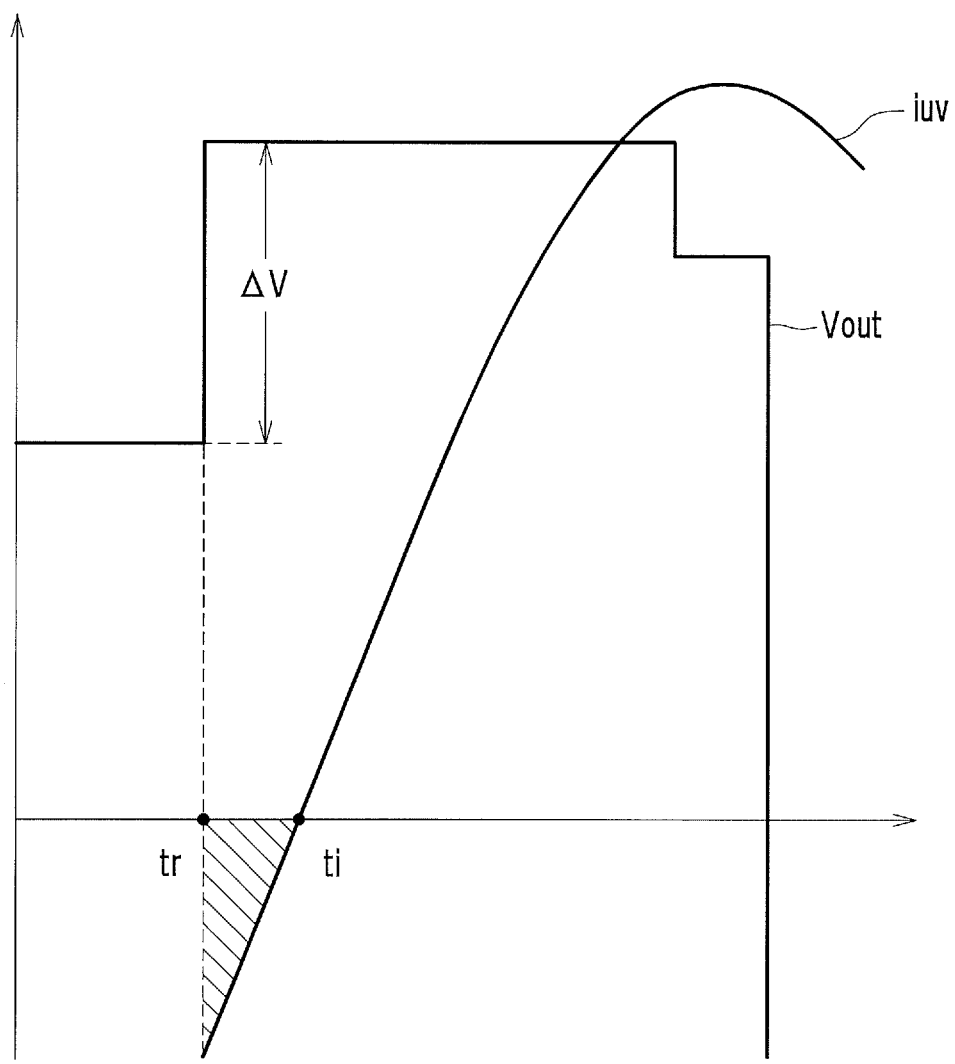
FIG. 7 is a graph schematically indicating output waveforms from the power conversion device provided in the power conversion system of the present invention.

Here, description will be given on the charge/discharge condition of the snubber element. FIG. 7 is a graph schematically indicating the output waveforms from the power conversion device 11 provided in the power conversion system 1 of the present invention. In FIG. 7, changes in the waveforms of the output voltage and the output current are plotted with time as the horizontal axis and output value as the vertical axis. In FIG. 7, the step-wise wave represents a waveform of the output voltage Vout that is output from the power conversion device 11. The sine wave represents a waveform of the output current iuv that is output from power conversion device 11 and flows from the U-phase to the V-phase. The snubber capacitor used as the snubber element reduces abrupt voltage change at both ends of the switching circuit by being charged and discharged at the time of commutation. Therefore, it is necessary to perform control not to change the direction (polarity) of the output current iuv that flows through the switching circuit until the snubber element is completely discharged. That is, in FIG. 7, the discharge should be completed before the output current iuv is inverted from negative to positive, i.e. before the time elapses from the time point tr to the time point ti. Specifically, as expressed by the following Formula (1), the charge/discharge condition of the snubber element is that the product of the value two times the capacitance C of the snubber element by the change ΔV in the output voltage is smaller than the absolute value of the integration value of the output current in the period from the time point tr to the time point tr.

$$2C \cdot \Delta V < |\int_{t_r}^{t_i} i \, dt| \qquad \text{(Formula (1))}$$

wherein C represents the capacitance of the snubber element (snubber capacitor), ΔV represents the change in the output voltage, tr represents the time point at which the absolute value of the output voltage reaches the maximum value (i.e. the time point of the last rising of the output voltage), ti represents the time point at which the polarity of the output current changes, and i represents the output current.

Now referring again to FIG. 6, the calculation unit 121 derives an input current Iin that is input to the power conversion device 11 based on: the time ratio ζ obtained by recursive calculation or by reading the predetermined default value; the phase φi of the output voltage; and the amplitude I of the output current. The phase φi of the output voltage and the amplitude I of the output current are based, as described above, on the waveform of the fundamental wave of the output voltage (target output voltage waveform) that is derived using the Fourier series expansion. Furthermore, the calculation unit 121 derives an instantaneous reactive power q from the detected input voltage E and the phase θ, and the derived input current Iin, based on the vector theory of instantaneous power.

As described above, the calculation unit 121 derives the amplitude I of the output current of the power conversion device 11, the phase difference (φi−φiopt), and the instantaneous reactive power q. The derived phase difference (φi−φiopt) is a phase difference (φi−φiopt) between the output current phase φi (second phase) and the optimal current phase φiopt (first phase). Thus, the control target to control the matrix converter 110 is to make the phase difference (φi−φiopt) zero. Although the phase difference (φi−φiopt) is preferably zero, it may be the value in the vicinity of zero. That is, the control may be performed so as to make the phase difference (φ−φiopt) as close to zero as possible. Also, regarding the derived instantaneous reactive power q, the control target to control the matrix converter 110 is to make the above value q=0. Although the value of the instantaneous reactive power is preferably zero, it may be the value in the vicinity of zero. That is, the control may be performed so as to make the value of the instantaneous reactive power as close to zero as possible. By making the value of the instantaneous reactive power q as close to zero as possible, the input power factor is controlled so as to be maximal, that is, as close to 1 as possible. The amplitude I of the derived output current, the phase difference (φi−φiopt) and the instantaneous reactive power q are used as parameters to derive the output frequency f and the time ratio ζ.

Then, the calculation unit 121 derives the output frequency f and the time ratio (switching time ratio) ζ based on the derived amplitude I of the output current, the phase difference (φi−φiopt), and the instantaneous reactive power q such that these parameters are as close to the respective target values as possible. As exemplarily shown in FIG. 6, the derivation of each of the output frequency f and the time ratio ζ, which is based on the amplitude I of the output current, the phase difference (φi−φiopt), and the instantaneous reactive power q, is obtained as a solution that asymptotically converges by repeatedly performing the calculations using the recursive algorithm. As a result of the recursive calculations, if the difference between the initial value and the final value of the input voltage phase θ converges, for example, to a value less than a predetermined value, the calculation unit 121 terminates the derivation processing to recursively calculate the output frequency f and the time ratio ζ. As to the time ratio ζ, it is possible to read the predetermined value set in advance. After deriving the output frequency f and the time ratio ζ, the calculation unit 121 outputs output values to the pulse output unit 122 so as to control the respective switching circuits of the matrix converter 110 and to realize the derived values of the output frequency f and the time ratio ζ.

The pulse output unit 122 controls the matrix converter 110 of the power conversion device 11 based on the output values from the calculation unit 121. In order to derive the output frequency f and the time ratio ζ each as the control target, the calculations are performed such that the instantaneous reactive power q is as close to zero as possible. That is, the matrix converter 110 of the power conversion device 11 is controlled according to the control target that makes the power factor as close to 1 as possible.

As described above, the calculation unit 121 derives, as to the power conversion device 11: the amplitude I of the output current; the phase difference (φi−φiopt); and instantaneous reactive power q, based on the various kinds of information such as the input voltage E and the phase θ. Then, the matrix converter 110 of the power conversion device 11 is controlled so as to make the derived results as close to the control target as possible. By controlling the operation of the matrix converter 110, the power conversion device 11 realizes the soft switching, and makes the input power factor as close to 1 as possible. Thus, it is possible to stably reduce distortion of the input current that is input to the power conversion device 11 and also to stably reduce pulsation of the output current that is output from the power conversion device 11.

<Experiment Results>

Figure 8:
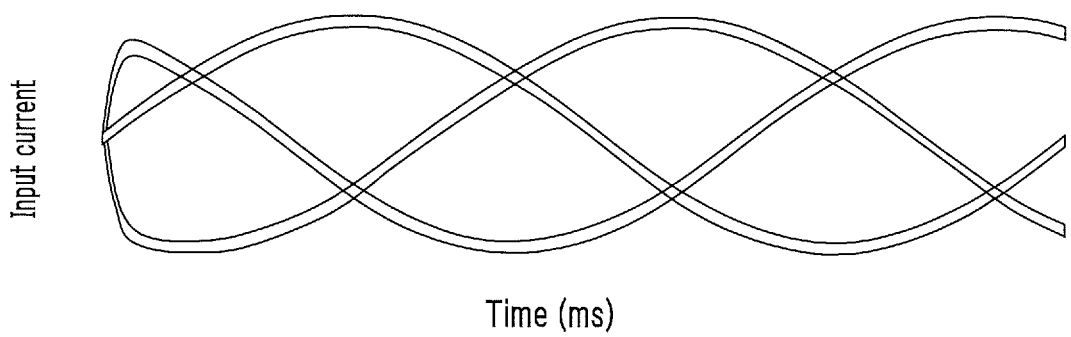
FIGS. 8(a) and 8(b) are graphs each showing an example of an experimental waveform of the input current that is input to the power supply control device in the power conversion system of the present invention.
Figure 8:
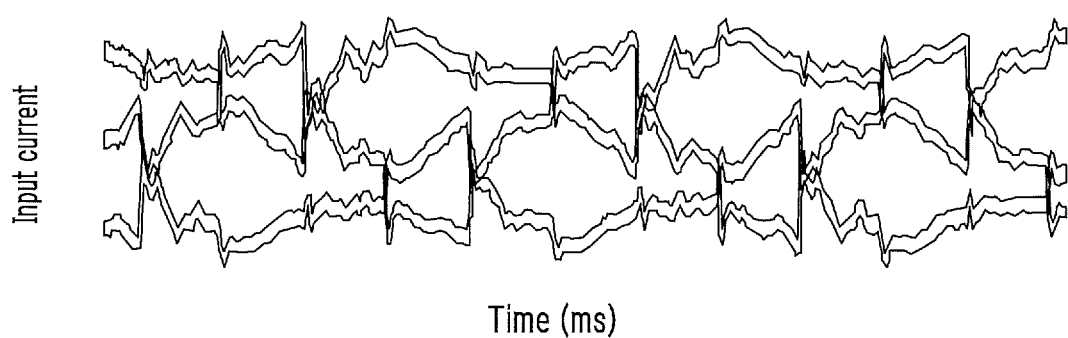

Here, experiment results will be described, which were obtained by the experiments in which the output of the power conversion device 11 controlled by the power supply control device 12 was tested in the power conversion system 1 of the present invention. FIGS. 8(a) and 8(b) are graphs each showing an example of an experimental waveform of the input current that is input to the power supply control device 12 in the power conversion system 1 of the present invention. In FIGS. 8(a) and 8(b), changes over time in the input currents of the respective phases that are input from the three-phase AC power supply are plotted with time as the horizontal axis and current value as the vertical axis. For the sake of drawing, in FIGS. 8(a) and 8(b), the maximum value and the minimum value of the amplitude of the current are extracted to show the profile.

FIG. 8(a) indicates results of control according to the target output current waveform in the case in which the output current that is output from the power conversion device 11 is supposed as the sine wave as described referring to FIG. 6. FIG. 8(b) is a comparative example, which indicates results of control according to the target output current waveform in the case in which the output current is supposed as the square wave. As can be clearly seen from comparison of FIG. 8(a) with FIG. 8(b), the distortion of the input current is reduced by supposing the output current as the sine wave.

Also, it is confirmed, from other experiments, that the control of the present invention can provide an effect of stably reducing the total harmonic distortion compared to the control using the conventional soft switching in which the frequency is constant.

The present invention should not be limited by the foregoing embodiments, and may be embodied in other forms without departing from the gist or essential characteristics thereof. Therefore, the embodiments described herein are to be considered in all respects as illustrative and not limiting. The technical scope of the present invention is indicated by the appended claims rather than by the foregoing embodiments, and all modifications and changes that come within the meaning and range of equivalency of the claims are intended to be embraced therein.

For example, in the above embodiment, the aspect in which the alternating current power that is output from the power conversion system 1 is converted into the direct current power is exemplarily described. However, it is possible to use the alternating current power without converting into the direct current power.

Also, in the above embodiment, the aspect in which the waveform of the fundamental wave is used is exemplarily described, which is derived by processing the output voltage waveform by the Fourier series expansion. However, the present invention is not limited to such a fundamental wave. It may be another alternating current waveform such as a trapezoidal waveform.

Also, in the above embodiment, the aspect in which the output frequency f and the time ratio $\zeta$ are derived such that the amplitude of the output current is close to the control target is exemplarily described. However, by modifying the calculation method appropriately, it is possible to use the amplitude of the output voltage in place of the amplitude of the output current. Thus, in the present invention, the output frequency f and the time ratio $\zeta$ may be derived such that the amplitude of the output voltage in place of the amplitude of the output current is close to the control target.

Also, in the above embodiment, the aspect in which the various calculations are performed by the power supply control device 12 is exemplarily described. However, the present invention is not limited thereto. For example, it is possible to perform, in advance, the various calculations so as to store in the power supply control device 12 a control table formed based on the calculation results. Thus, the power supply control device 12 may determine the control method by referring to the control table according to the obtained information on the input voltage and the like.

Furthermore, the switching circuit that is used in the matrix converter 110 in the power conversion device 11 may have another circuit configuration provided that it is a bidirectional switch. For example, it is possible to use a bidirectional switch having a circuit configuration in which two switching elements, to which respective diodes serving as free-wheeling diodes are connected in anti-parallel to each other, are reversely connected in series, and a snubber capacitor is connected in parallel with the switching element connected in series.

DESCRIPTION OF REFERENCE NUMERALS

1 Power conversion system
10 Multi-phase AC power supply (three-phase AC power supply)
11 Power conversion device
110 Matrix converter
111 Resonant circuit (LLC circuit)
C1-C6 Snubber capacitor (snubber element)
S1-S12 Switching element
12 Power supply control device
120 Input voltage detection unit
121 Calculation unit
122 Pulse output unit
123 Output voltage detection unit
2 Power load

The invention claimed is:

1. A power supply control device configured to control a power conversion device comprising a plurality of switching circuits connected respectively to every phase of a multi-phase AC power supply, each switching circuit of the plurality of switching circuits having a snubber element capable of being charged and discharged, the power conversion device being configured to: perform AC-AC conversion of input from the multi-phase AC power supply by the plurality of switching circuits; and output the converted AC power via a resonant circuit, the power supply control device comprising:

control circuitry that performs control of the power conversion device to make an amplitude of an output current, a phase of the output current and an instantaneous reactive power as close to a control target as possible, the amplitude of the output current, the phase of the output current and the instantaneous reactive power being derived based on: an input voltage and a phase of a multi-phase current that is input to the power conversion device; and characteristics of the resonant circuit, wherein the amplitude of the output current of the power conversion device is derived from a target output voltage waveform that is obtained by removing a higher order component from a staircase waveform derived based on the input voltage and the phase.

2. A power supply control device configured to control a power conversion device comprising a plurality of switching circuits connected respectively to every phase of a multi-phase AC power supply, each switching circuit of the plurality of switching circuits having a snubber element capable of being charged and discharged, the power conversion device being configured to: perform AC-AC conversion of input from the multi-phase AC power supply by the plurality of switching circuits; and output the converted AC power via a resonant circuit, the power supply control device comprising:

control circuitry that performs control of the power conversion device to make an amplitude of an output current, a phase of the output current and an instantaneous reactive power as close to a control target as possible, the amplitude of the output current, the phase of the output current and the instantaneous reactive power being derived based on: an input voltage and a phase of a multi-phase current that is input to the power conversion device; and characteristics of the resonant circuit, wherein the instantaneous reactive power is derived from: a target output voltage waveform derived from the input voltage and the phase; and a target output current waveform that periodically changes.

3. The power supply control device according to claim 2, wherein the amplitude of the output current of the power conversion device is derived based on: an amplitude and a phase of the target output voltage waveform; the characteristics of the resonant circuit; and an output frequency recursively obtained, and the amplitude and the phase of the target output voltage waveform are derived by: deriving a staircase waveform based on the input voltage and the phase, and a switching time ratio of the switching circuits; and removing a higher order component from the derived staircase waveform.

4. The power supply control device according to claim 2, wherein the phase of the output current of the power conversion device is derived based on: a derived staircase waveform; an output frequency recursively obtained; a charge/discharge condition of the snubber element; the amplitude of the output current; a phase of the target output voltage waveform; and the phase of the output current, the amplitude and the phase of the output current are derived based on: an amplitude and the phase of the target output voltage waveform; the characteristics of the resonant circuit; and the output frequency recursively obtained, and the amplitude and the phase of the target output voltage waveform are derived by: deriving the staircase waveform based on the input voltage and the phase, and a switching time ratio of the switching circuits; and removing a higher order component from the derived staircase waveform.

5. A power conversion system comprising:

a power conversion device comprising a plurality of switching circuits connected respectively to every phase a multi-phase AC power supply, each switching circuit of the plurality of switching circuits having a snubber element capable of being charged and discharged, the power conversion device being configured to: perform AC-AC conversion of input from the multi-phase AC power supply by the plurality of switching circuits; and output the converted AC power via a resonant circuit; and the power supply control device according to claim 2, the power supply control device being configured to control the power conversion device.

6. The power supply control device according to claim 4, wherein the phase of the output current of the power conversion device is derived from a phase difference between: a first phase derived based on the staircase waveform, the output frequency recursively obtained, and a capacitance that serves as the charge/discharge condition of the snubber element; and a second phase derived based on the phase of the target output voltage waveform and the phase of the output current, and the control circuitry makes the phase difference zero as the control target.

7. The power supply control device according to claim 2, wherein the instantaneous reactive power is derived from an input current, the input voltage and the phase, the input current that is input to the power conversion device is derived based on: a phase of the target output voltage waveform and the phase of the output current; the amplitude of the output current; a switching time ratio of the switching circuits; and a target output current waveform that periodically changes, the amplitude and the phase of the output current are derived based on: an amplitude and the phase of the target output voltage waveform; the characteristics of the resonant circuit; and an output frequency recursively obtained, and the amplitude and the phase of the target output voltage waveform are derived by: deriving a staircase waveform based on the input voltage and the phase, and a switching time ratio of the switching circuits; and removing a higher order component from the derived staircase waveform.

8. The power supply control device according to claim 7, wherein the target output current waveform that periodically changes comprises a sine wave.

9. The power supply control device according to claim 2, wherein a switching time ratio of the switching circuits is obtained by recursive calculation or by reading a predetermined value set in advance.

10. The power supply control device according to claim 2, wherein the control circuitry makes the instantaneous reactive power zero as the control target.

11. The power supply control device according to claim 1, wherein the amplitude of the output current of the power conversion device is derived based on: an amplitude and a phase of the target output voltage waveform; the characteristics of the resonant circuit; and an output frequency recursively obtained, and the amplitude and the phase of the target output voltage waveform are derived by: deriving a staircase waveform based on the input voltage and the phase, and a switching time ratio of the switching circuits; and removing a higher order component from the derived staircase waveform.

12. The power supply control device according to claim 1, wherein the phase of the output current of the power conversion device is derived based on: a derived staircase waveform; an output frequency recursively obtained; a charge/discharge condition of the snubber element; the amplitude of the output current; a phase of the target output voltage waveform; and the phase of the output current, the amplitude and the phase of the output current are derived based on: an amplitude and the phase of the target output voltage waveform; the characteristics of the resonant circuit; and the output frequency recursively obtained, and the amplitude and the phase of the target output voltage waveform are derived by: deriving the staircase waveform based on the input voltage and the phase, and a switching time ratio of the switching circuits; and removing a higher order component from the derived staircase waveform.

13. The power supply control device according to claim 12, wherein
the phase of the output current of the power conversion device is derived from a phase difference between: a first phase derived based on the staircase waveform, the output frequency recursively obtained, and a capacitance that serves as the charge/discharge condition of the snubber element; and a second phase derived based on the phase of the target output voltage waveform and the phase of the output current, and
the control circuitry makes the phase difference zero as the control target.

14. The power supply control device according to claim 1, wherein
the instantaneous reactive power is derived from an input current, the input voltage and the phase,
the input current that is input to the power conversion device is derived based on: a phase of the target output voltage waveform and the phase of the output current; the amplitude of the output current; a switching time ratio of the switching circuits; and a target output current waveform that periodically changes,
the amplitude and the phase of the output current are derived based on: an amplitude and the phase of the target output voltage waveform; the characteristics of the resonant circuit; and an output frequency recursively obtained, and
the amplitude and the phase of the target output voltage waveform are derived by: deriving a staircase waveform based on the input voltage and the phase, and a switching time ratio of the switching circuits; and removing a higher order component from the derived staircase waveform.

15. The power supply control device according to claim 14, wherein
the target output current waveform that periodically changes comprises a sine wave.

16. The power supply control device according to claim 1, wherein
a switching time ratio of the switching circuits is obtained by recursive calculation or by reading a predetermined value set in advance.

17. The power supply control device according to claim 1, wherein
the control circuitry makes the instantaneous reactive power zero as the control target.

18. A power conversion system comprising:
a power conversion device comprising a plurality of switching circuits connected respectively to every phase of a multi-phase AC power supply, each switching circuit of the plurality of switching circuits having a snubber element capable of being charged and discharged, the power conversion device being configured to: perform AC-AC conversion of input from the multi-phase AC power supply by the plurality of switching circuits; and output the converted AC power via a resonant circuit; and
the power supply control device according to claim 1, the power supply control device being configured to control the power conversion device.

19. A power supply control method for controlling a power conversion device comprising a plurality of switching circuits connected respectively to every phase of a multi-phase AC power supply, the power conversion device being configured to:
perform AC-AC conversion of input from the multi-phase AC power supply by the plurality of switching circuits; and output the converted AC power via a resonant circuit, the power supply control method comprising performing control of the power conversion device to make an amplitude of an output current, a phase of the output current and an instantaneous reactive power as close to a control target as possible, the amplitude of the output current, the phase of the output current and the instantaneous reactive power being derived based on: an input voltage and a phase of a multi-phase current that is input to the power conversion device; and characteristics of the resonant circuit, wherein
the amplitude of the output current of the power conversion device is derived from a target output voltage waveform that is obtained by removing a higher order component from a staircase waveform derived based on the input voltage and the phase.

20. A power supply control method for controlling a power conversion device including a plurality of switching circuits connected respectively to every phase of a multi-phase AC power supply, the power conversion device being configured to:
perform AC-AC conversion of input from the multi-phase AC power supply by the plurality of switching circuits; and output the converted AC power via a resonant circuit, the power supply control method comprising performing control of the power conversion device to make an amplitude of an output current, a phase of the output current and an instantaneous reactive power as close to a control target as possible, the amplitude of the output current, the phase of the output current and the instantaneous reactive power being derived based on: an input voltage and a phase of a multi-phase current that is input to the power conversion device; and characteristics of the resonant circuit, wherein
the instantaneous reactive power is derived from: a target output voltage waveform derived from the input voltage and the phase; and a target output current waveform that periodically changes.

* * * * *